(12) United States Patent
Girardi et al.

(10) Patent No.: US 6,299,120 B1
(45) Date of Patent: Oct. 9, 2001

(54) ARRANGEMENT FOR ADJUSTING THE LONGITUDINAL POSITION AND MAINTAINING THEREIN A MOTOR VEHICLE SEAT

(75) Inventors: Philippe Girardi, Groslay; Marc Amerigo, Boulogne Billancourt, both of (FR)

(73) Assignee: Renault, Boulogne Billancourt (FR)

( * ) Notice: Subject to any disclaimer, the term of this patent is extended or adjusted under 35 U.S.C. 154(b) by 0 days.

(21) Appl. No.: 09/403,764
(22) PCT Filed: Apr. 24, 1998
(86) PCT No.: PCT/FR98/00819
§ 371 Date: Dec. 15, 1999
§ 102(e) Date: Dec. 15, 1999
(87) PCT Pub. No.: WO98/49026
PCT Pub. Date: Nov. 5, 1998

(30) Foreign Application Priority Data

Apr. 30, 1997 (FR) .................................................. 97 05345

(51) Int. Cl.$^7$ ...................................................... F16M 13/00
(52) U.S. Cl. ......................................... 248/429; 297/344.1
(58) Field of Search ........................... 297/344.1; 248/429

(56) References Cited

U.S. PATENT DOCUMENTS 3,507,472 * 4/1970 Agee et al. .
6,105,921 * 8/2000 Carrig et al. .

* cited by examiner

*Primary Examiner*—Milton Nelson, Jr.
(74) *Attorney, Agent, or Firm*—Oblon, Spivak, McClelland, Maier & Neustadt, P.C.

(57) ABSTRACT

A device for adjusting a longitudinal position of a subassembly, in particular a seat of an automobile, is positionable on a horizontal floor of a passenger compartment of a vehicle which includes a movable expandable mechanism to lock and unlock the device in different positions.

10 Claims, 7 Drawing Sheets

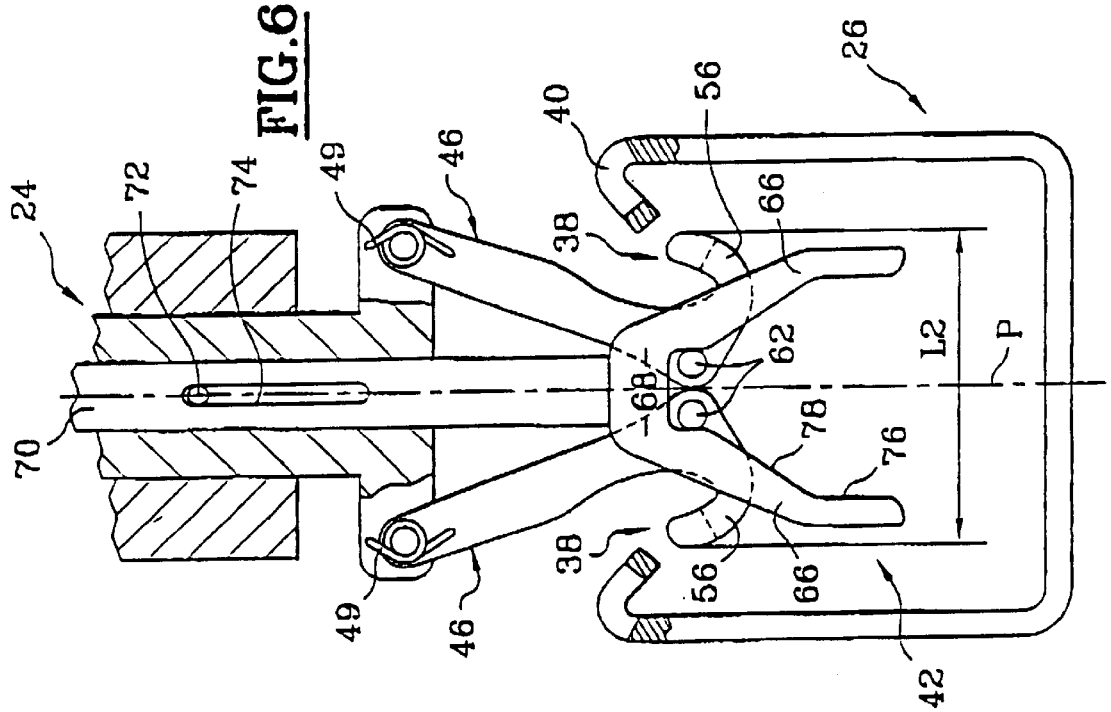
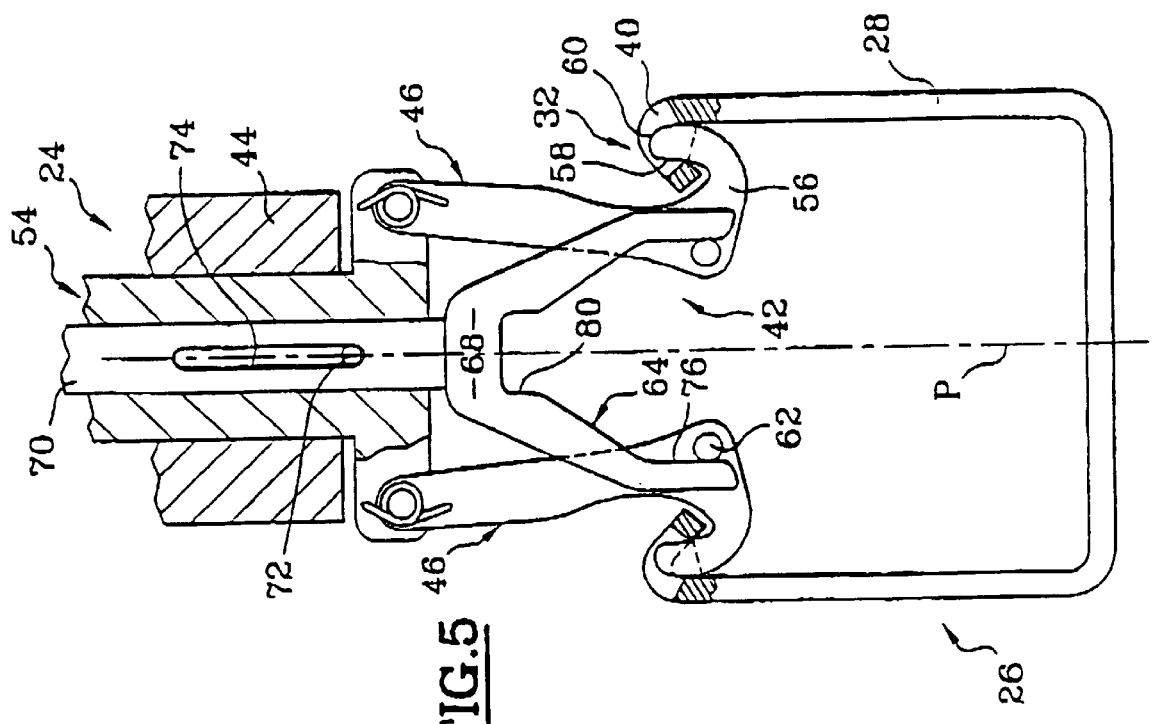

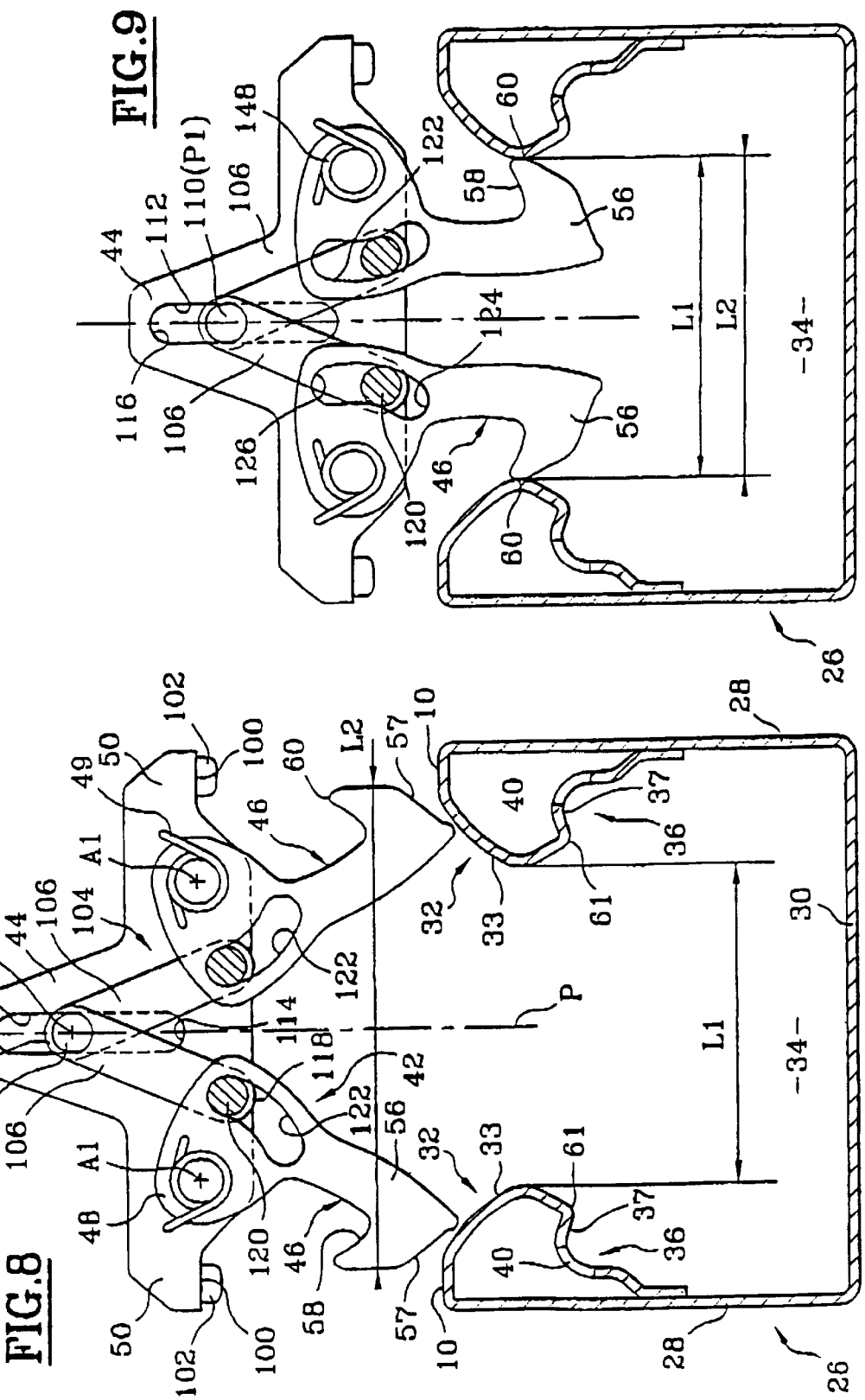

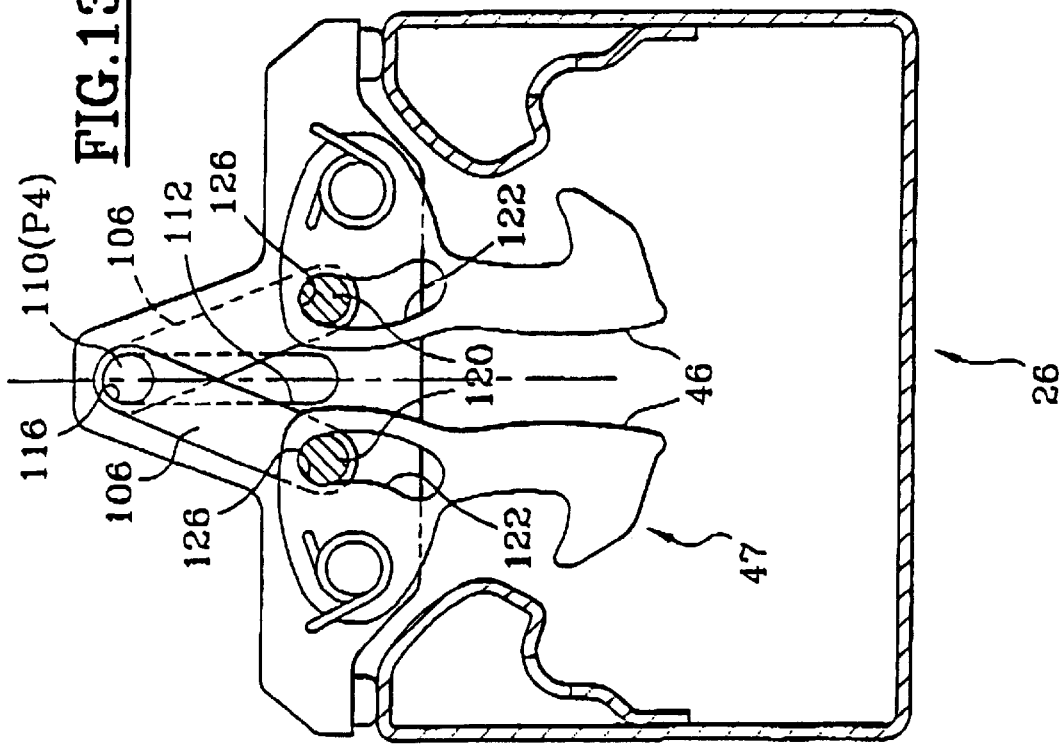
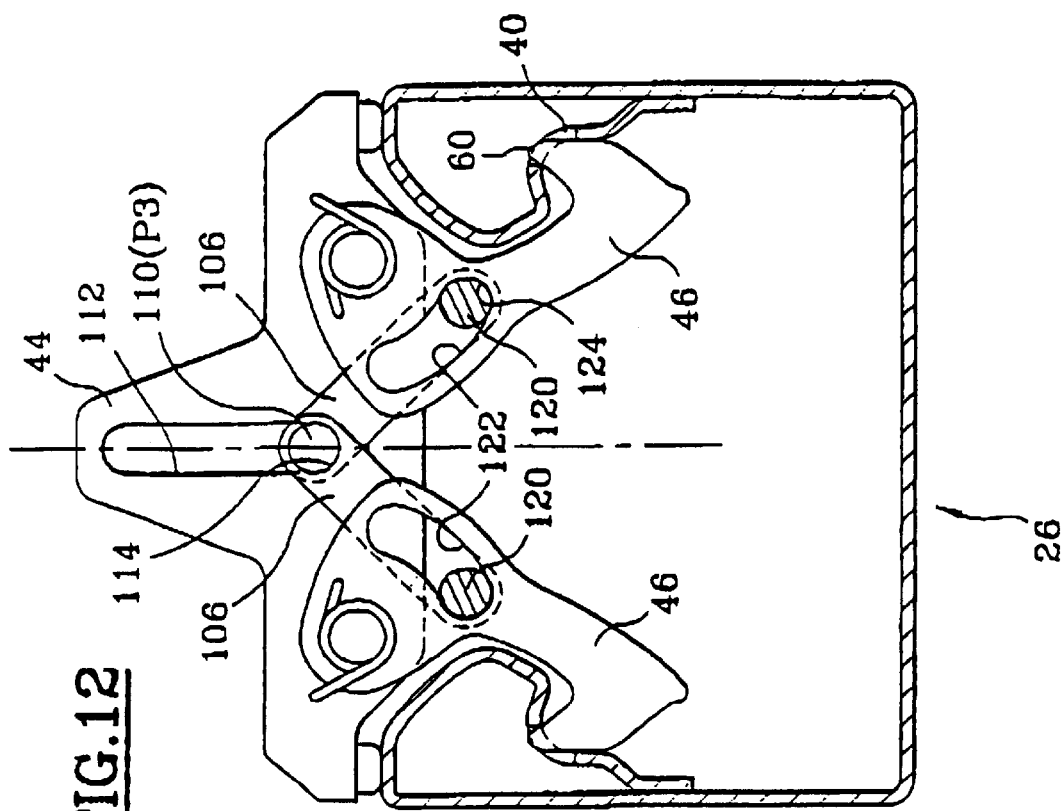

ARRANGEMENT FOR ADJUSTING THE LONGITUDINAL POSITION AND MAINTAINING THEREIN A MOTOR VEHICLE SEAT

BACKGROUND OF THE INVENTION

1. Field of the Invention

The invention proposes to a device for adjusting the longitudinal position of a subassembly, especially a seat, on the horizontal floor of the passenger compartment of a motor vehicle and for locking the same in an adjusted position.

The invention relates more particularly to a system for outfitting the interior of a motor vehicle of the "one-compartment" type, which must embody flexible outfitting capabilities, and especially great modularity, with regard to both the number of removable seats or subassemblies provided in the passenger compartment, and the number of positions that these subassemblies can occupy.

2. Discussion of the Background

According to a first known design, it has already been suggested that a plurality of series of fastening points be provided on the vehicle floor, each of which series, preferably having four fastening points for the four feet of the seat or of the subassembly, determines a mounting and fixing position.

A device for increasing the modularity of the outfitting of the passenger compartment has already been suggested. Such a device is described and illustrated in, for example, European Patent Application A 0615879, wherein the horizontal floor of the passenger compartment is equipped with at least two parallel rails or slideways which accommodate, in longitudinal sliding manner, guide members in the form of slides, also called shuttles, which guide the longitudinal displacements of the seat and which make it possible to ensure locking of the seat in adjusted longitudinal position, the seat having substantially vertical orienting feet whose lower ends contain means of known design for fastening the seat to the slides or shuttles.

This embodiment permits the modularity to be increased and also permits the longitudinal position of a seat to be adjusted while conserving its orientation and fastening, by shifting the slides.

However, this design relies on using as many pairs of slides or shuttles as correspond to the number of seats to be mounted and, if it is not desired that the slides be visible in the passenger compartment, they must be fitted in the bottom of slideways embedded in the floor, thus making it difficult to fasten a seat to the upper faces of the slides, in that these are not visible and are masked by brush-like means which partly block the central longitudinal slot of the rail-shaped slideway.

SUMMARY OF THE INVENTION

The objective of the invention is to propose a new design of an adjustment device of the type mentioned hereinabove, which design permits these disadvantages to be remedied.

Toward this objective, the invention proposes a device characterized in that the lower end of at least one of the feet is equipped with a movable expandable mechanism controlled between:

a first position, defined as engagement or disengagement position, in which two mechanism-locking members with symmetric and opposed action relative to a central longitudinal plane are in inwardly retracted position, in which their transverse width permits vertical introduction or extraction of the mechanism in the slideway via a central longitudinal slot thereof, bounded by two longitudinal and parallel upper rims of the slideway;

and a second extreme position, defined as locking position, in which each of the two locking members is extended transversely outward to face an internal portion of one of the upper rims of the slot, with which they cooperate in fastening, thus vertically and longitudinally immobilizing the foot relative to the slideway; while passing through at least one intermediate position, defined as adjustment position, in which each of the two locking members is extended transversely outward to face the said internal portion of one of the upper rims of the slot, thus vertically retaining the foot relative to the slideway and permitting longitudinal displacements of the foot relative to the slideway.

According to other characteristics of the invention:

the two locking members are two locking levers, each of which is mounted to pivot, in the vicinity of its upper end, around a longitudinal hinge pin, which is supported by the foot and the active lower part of which has a profile complementary to the profile of the internal portion of a rim of the slot of the slideway which faces it;

the upper face of the lower end of each lever is formed into a hook, which cooperates with the lower fastening face of the said internal portion;

the lower fastening face of the said internal portion is provided with a series of longitudinally distributed notches, each of which constitutes a locking catch capable of accommodating the lower hook-shaped end of a locking lever;

the locking levers are biased resiliently toward their extreme locking position;

the lower face of the lower end of each lever is profiled in such a manner that it can cooperate with the upper guide face of the said internal portion to retract the lever transversely inward, against its resilient biasing means, during engagement of the mechanism in the slideway;

the mechanism has a lever-control fork, which is mounted to move by sliding vertically relative to the hinge pins of the levers, and each of the two branches of which cooperates via a cam profile with a control peg supported by each lever in the vicinity of its lower end, and the displacements of which, from a high position to a low unlocking position, bring about retraction of the levers transversely inward, against their resilient biasing means;

the levers and the control fork are mounted movably relative to a support, which is mounted to slide vertically over the lower part of the foot between a low position and a high active locking position, and the lower part of the foot is braced vertically on the bottom of the slideway via means for guiding the longitudinal displacements of the foot relative to the slideway;

the upper part of each lever is provided with an opening shaped as an arc of a circle centered on its hinge pin, in which opening there is accommodated a control finger supported by the lower end of a control rod, whose upper end is mounted pivotably, around a longitudinal pin, on a control slide which is vertically movable relative to the lower part of the foot;

the subassembly is a motor vehicle seat.

BRIEF DESCRIPTION OF THE DRAWINGS

Other characteristics and advantages of the invention will become clear upon reading the detailed description hereinafter, which can be understood by referring to the attached drawings, wherein:

FIG. 5 is a view similar to that of FIG. 4, in which the foot is illustrated in locked position;

FIG. 6 is a view similar to that of FIG. 3, in which the foot is illustrated during its phase of disengagement from the slideway;

FIG. 8 is a view similar to those of FIGS. 3 to 6, which illustrates a second embodiment of a device according to the teachings of the invention, on which the foot is illustrated in a first part of its phase of engagement in the slideway;

FIG. 9 is a view similar to that of FIG. 8, in which the foot is illustrated in a second part of its phase of engagement in the slideway;

FIG. 12 is a view similar to that of FIG. 11, in which the foot is illustrated in a longitudinally blocked and locked position; and FIG. 13 is a view similar to that of FIG. 12, in which the foot is illustrated during its phase of disengagement from the slideway;

DESCRIPTION OF THE PREFERRED EMBODIMENTS

Figure 1:
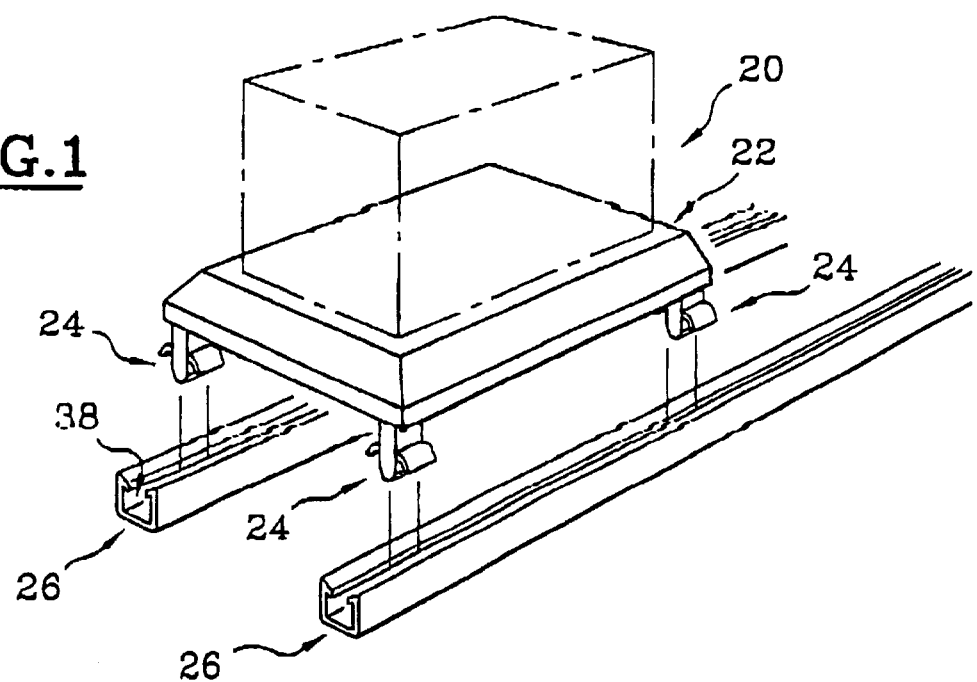
FIG. 1 is a perspective schematic view illustrating a subassembly associated with two parallel slideways for adjustment of the longitudinal position and for blocking of the subassembly.

FIG. 1 shows a subassembly such as a removable motor vehicle seat, provided with a rigid structure or chassis, a lower part 22 of which is equipped at its four opposite corners with four feet 24 having substantially vertical orientation.

Each of the two pairs of aligned feet is designed such that the lower vertical ends of feet 24 are accommodated inside two slideways, or longitudinal and parallel slides 26, which are provided to be fixed on the horizontal floor of a motor vehicle (not shown), for example on the upper face thereof, or alternatively to be lodged in longitudinal grooves of the floor.

Figure 2:
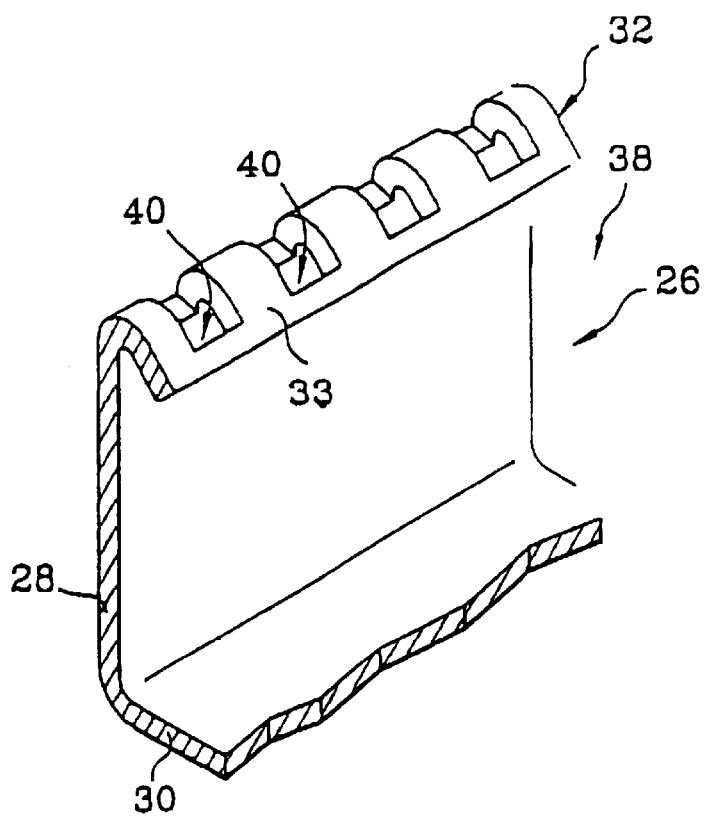
FIG. 2 is a perspective detail view which partly illustrates a segment of a slideway according to the teachings of the invention.
Figure 3:
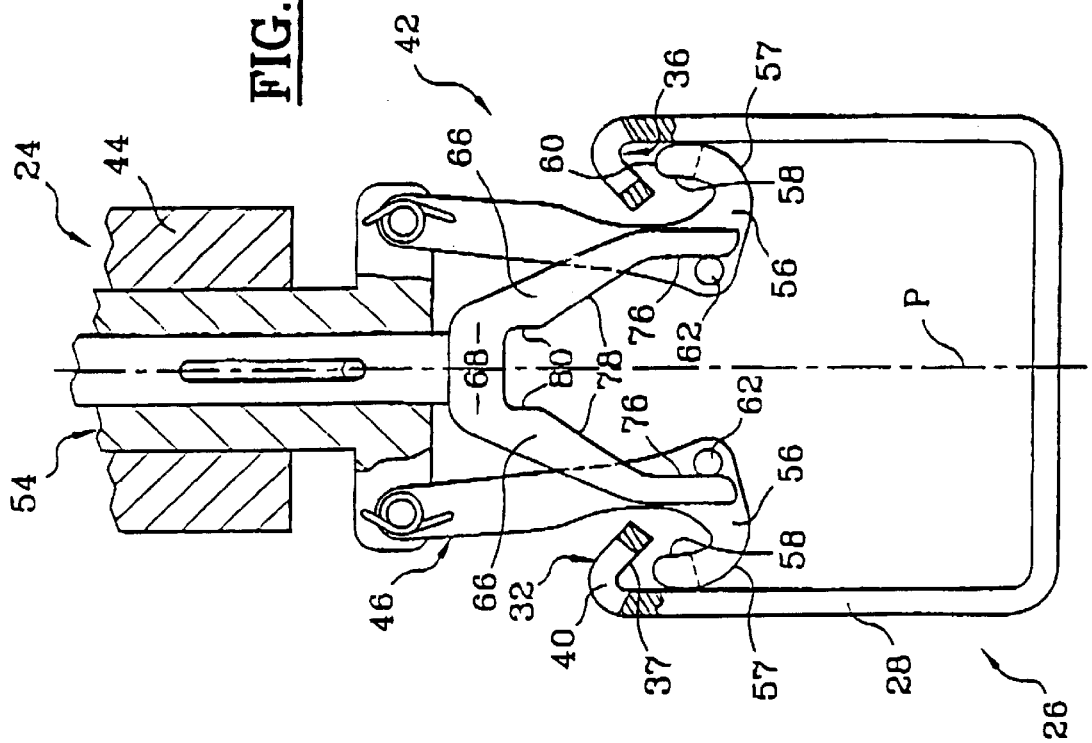
FIG. 3 is an end view, partly in transverse section, on which the lower part of a foot is illustrated in association with a slideway, the whole being represented during a phase of engagement of the foot in the slideway.

According to the teachings of the invention, as can be seen in particular in FIGS. 2 and 3, each of the two slideways 26 has longitudinal design symmetry relative to a central longitudinal vertical plane P, and each is made in this case in the form of a longitudinal section of cut and bent sheet metal.

Each slideway, in transverse section, is substantially U-shaped and open upwards.

Slideway 26 substantially comprises two opposite side flanges 28, which are interconnected at their lower extremities by a flat horizontal bottom 30.

Flanges 28 run parallel to each other, and have vertical orientation.

At its upper extremity, each side flange 28 is prolonged transversely inward by a sheet-metal part in the form of strip bent over inward and downward, this strip forming an upper rim 32 of slideway 26, upper faces 33 of which are inclined in the form of a vee toward interior 34 of slideway 26 and the lower faces of which form internal portions 36 of upper rims 32 within the meaning of the invention.

Upper rims 32 define between them a longitudinal central slot 38 of transverse width L1 in slideway 26.

As can be seen in particular in FIG. 2, each of the upper rims 32 is provided with a series of notches 40 distributed longitudinally at regular intervals along rim 32, each forming a blocking and locking catch, as will be explained hereinafter.

Referring to FIGS. 1 to 7, there will now be described the first embodiment of expandable locking mechanism 42, associated with lower end 44 of a foot 24, which is designed to cooperate with the first embodiment of slideway 26 illustrated in FIGS. 2 to 7.

Mechanism 42 substantially comprises two locking levers 46, which extend substantially vertically and each of which is pivoted, via its upper end 48 and around a longitudinal pin A1, on a lower flange 50, which extends transversely outward from body 52 of a support 54 for expandable mechanism 42, which is mounted to slide vertically relative to lower part 44 of foot 24.

Each locking lever 46 is provided with an active lower part 56, upper face 58 of which is formed as a hook with shape complementary to the profile of lower face 37 of internal portion 36 of facing upper rim 32 of slideway 26.

As will be explained hereinafter, the profile of hook-shaped upper face 58 is also configured such that free tip 60 of each hook is capable of penetrating at least partly into a notch 40.

Lower surface 57 of lower end 56 of each lever 46 has a convex curved profile, which is designed to cooperate with inclined upper faces 33 of upper rims 32 of slideway 26.

Each lever 46 supports, in the vicinity of its active lower end 56, a control finger 62, which extends longitudinally from a transverse face of lever 26 and which is capable of cooperating with a cam profile 64 formed facing it in one of the two branches 66 belonging to a control fork 68 of levers 46.

Figure 4:
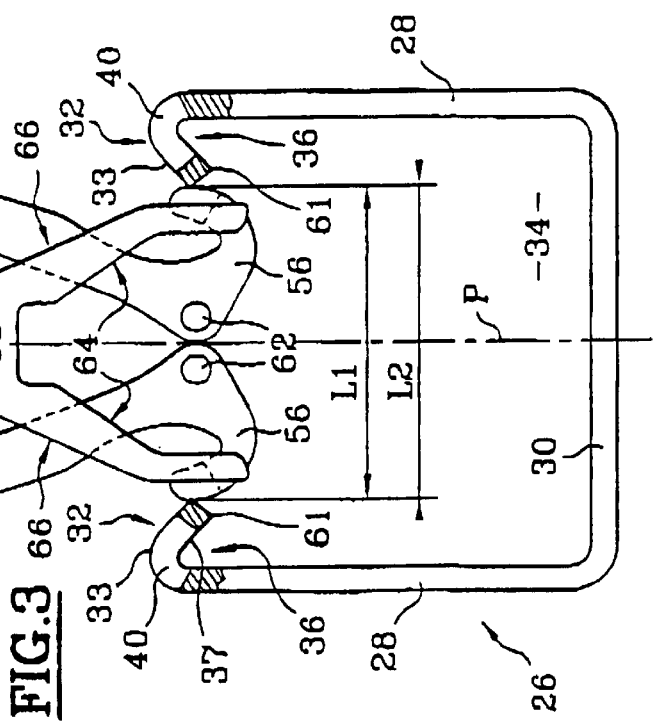
FIG. 4 is a view similar to that of FIG. 3, in which the foot is illustrated in adjustment position.

At its upper part, fork 68 is provided with a vertical control bar 70, which is mounted to slide vertically in support 54 of levers 46 between an extreme upper position, which is illustrated in particular in FIGS. 3 to 5, and an extreme lower position, which is illustrated in FIG. 6.

The extreme positions of fork 68 relative to support 54 of levers 46 are determined by the cooperation of a stop peg 72 with one or the other of the two opposite ends of an oblong hole 74 formed in control bar 70.

Cam profile 64 of each of the branches 66 is formed on an internal side face of the branch and is provided, successively from bottom to top, with a lower vertical segment 76, an intermediate inclined segment 78 and an upper vertical segment 80, the transverse distance separating parallel lower vertical segments 76 being clearly larger than that separating parallel upper vertical segments 80.

Each lever 46 is equipped with a spring 49 which at all times biases it resiliently toward a position offset transversely toward the outside. In other words, springs 49 urge active lower ends 56 of levers 46, causing them to move apart from each other and from central longitudinal plane P.

Figure 7:
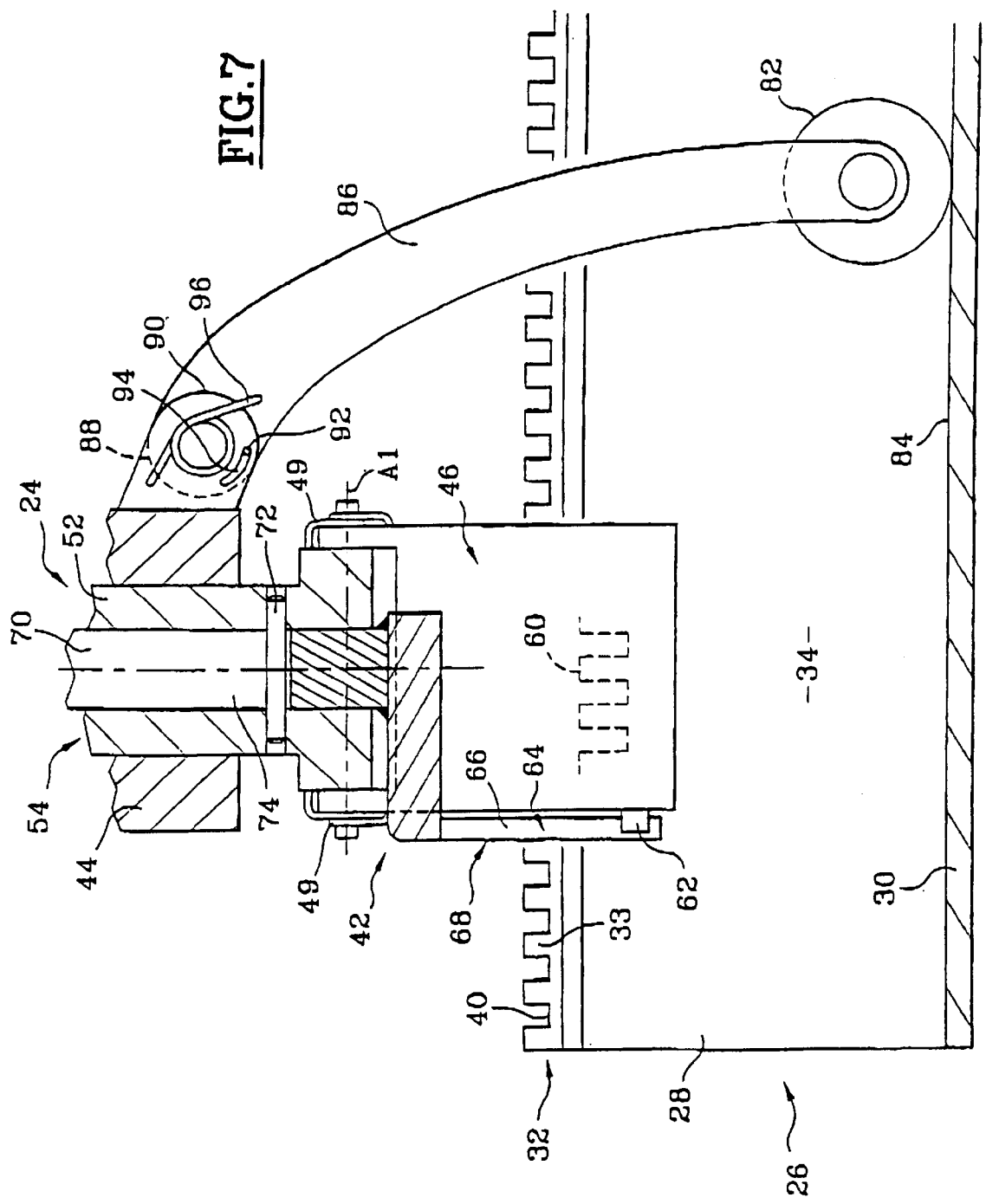
FIG. 7 is a side view of the foot in the slideway.

As can be seen more particularly in FIG. 7, levers 46 have large longitudinal dimension, such that their hook-shaped active lower ends 56 present a series of tips 60 distributed longitudinally at the same interval as notches 40, in order to improve cooperation of the levers with upper rims 32 of slideway 26.

In order to ensure guidance of the longitudinal displacements of foot 24 relative to slideway 26, especially in view of permitting adjustment of the longitudinal position of foot 24, lower part 44 is equipped with a wheel 82 which rolls along upper horizontal face 84 of bottom 30 and which is mounted to rotate, around a transverse spindle, the lower end of an articulated arm 86 whose upper end 88 is mounted pivotably, around a transverse spindle, on a longitudinal bracket 90 of lower part 44 of foot 24.

Arm 86 can pivot between two extreme angular positions, which are determined by the cooperation of a peg 92 with the opposite ends of an opening 94 formed in bracket 90.

Arm 86 is urged resiliently toward one of its two extreme angular positions by a spiral spring 96 (see FIG. 7), coming closer to the general axis of the foot.

When articulated arm 86 is in its maximum angular position illustrated in FIG. 7, the cooperation of wheel 82 with upper face 84 of bottom 30 determines the height of foot 24 relative to slideway 26.

Referring to FIGS. 3 to 6, the operation of the adjustment and locking device will now be described.

During the phase of engagement of expandable mechanism 42 with interior 34 of slideway 26, as illustrated in FIG. 3, convex curved lower surfaces 57 of levers 46 cooperate with inclined upper faces 33 of upper rims 32 to bring levers 46 mutually closer together in such a way that maximum transverse width L2 of the mechanism is less than or equal to width L1 of the slot, thus permitting vertical downward introduction of levers 46 into slideway 26.

During this engagement phase, support 54 of levers 46 is fixed relative to lower part 44 of foot 24, in low position relative thereto.

From the position illustrated in FIG. 3, engagement continues until tips 60 of the lower hooks of levers 46 pass below lower corners 61 of upper rims 32.

Below this height, and under the action of springs 49, levers 46 immediately spread apart transversely outward until control pegs 62 become stopped against lower vertical segments 76 of cam profiles 64 of control fork 68.

In this position, which is illustrated in FIG. 4, lower ends 56 in the form of hooks 58, 60 of levers 46 are extended to face lower faces 37 of internal portions 36 of upper rims 32 of slideway 26, and so it is impossible to extract mechanism 42 vertically from slideway 26. In other words, foot 24 is retained vertically upward relative to slideway 26.

The height of hooks 58, 60, or in other words the vertical clearance that exists between their tips 60 and lower faces 37, is determined by the action of arm 86 coming up against a stop, as illustrated in FIG. 7.

In the position illustrated in FIG. 4, it is possible to adjust the longitudinal position of foot 24 relative to slideway 26.

To immobilize foot 24 longitudinally relative to slideway 26, by starting from the adjustment position illustrated in FIG. 4, the user acts on support 54 by means of a maneuvering member, not shown in the figures, to cause this support to shift from its low position, which is illustrated in FIG. 4, to its high position, which is illustrated in FIG. 5.

The vertical upward travel of support 54 causes a simultaneous vertical upward displacement of levers 46 and of fork 68, the relative vertical position of this fork relative to support 54 and to lever 46 being unchanged.

This vertical travel causes penetration of hooks 58, 60 into notches 40 of upper rims 32, resulting in the longitudinal immobilization of foot 24 relative to slideway 26.

To unlock the mechanism in view of permitting disengagement thereof from slideway 26, by a vertical extraction movement, the user acts on control bar 70 of fork 68, causing vertical downward displacement thereof from the position illustrated in FIG. 5, until fork 68 reaches its extreme low position, which is illustrated in FIG. 6.

Through cooperation of control fingers 62 successively with segments 76, 78 and 80 of cam profiles 64 of branches 66, the downward travel of fork 68 causes active lower ends 56 of locking levers 46 to move mutually inward transversely to become closer to each other, in the direction of central longitudinal plane P, and does so against the forces exerted by springs 49.

The orientation of inclined intermediate segments 78 is such that they cause pivoting of levers 46, thus allowing hook-shaped ends 58, 60 to escape from notches 40.

The distance separating upper vertical segments 80 is such that maximum transverse width L2 of mechanism 42, which is again in contracted position, is less than width L1 of slot 38, thus allowing it to be extracted from slideway 26.

There will now be described the second embodiment of the invention, which is illustrated in FIGS. 8 to 13, in which components identical, similar or analogous to those described hereinabove are designated by the same reference numbers.

First of all, in the second embodiment, slideway 26 differs from the preceding embodiment in that its upper rims 32 are shaped by completely folding over the sheet, to provide them with greater rigidity, each having the form of an upper longitudinal box.

Lower part 44 of foot 24 is of one-piece construction, meaning that a vertically movable support no longer exists, and upper ends 48 of locking levers 46 of expandable mechanism 42 are thus mounted pivotably, around their longitudinal pins A1, directly on lower part 44, which is provided with two flanges 50, lower faces 100 of which support runners 102, which are capable of vertically engaging against a stop and then sliding longitudinally on portions of upper horizontal plane surfaces 103 facing box-like upper rims 32 of slideway 26.

A device 104 is provided for control of the pivoting movements of locking lever 46 around pins A1 thereof.

Device 104 comprises two control rods or linkages 106 having symmetric and opposed action, each of which is mounted pivotably at its upper end 108, around a longitudinal pin A3 situated on central vertical plane P, on a longitudinally oriented pivot 110, which constitutes a slide mounted to move vertically in a vertical oblong guide hole 112 formed in lower part 44 of the foot.

Oblong hole 112 is bounded vertically downward by an end 114 and upward by an end 116. Each rod 106 is inclined downwardly and outwardly, and its lower end 118 supports a longitudinally oriented control finger 120, which is accommodated slidingly in a corresponding opening 122, which is shaped like an arc of a circle formed in the upper part of each lever 46, and which is centered on hinge pin A1 of the corresponding lever.

Each opening 122 is bounded by a lower end 124 and an upper end 126.

There will now be described the mode of operation of the device illustrated in FIGS. 8 to 13.

The phase of engagement of mechanism 42 in slideway 26 is illustrated in two consecutive parts in FIGS. 8 and 9.

Before any contact of lower surfaces 57 of active lower parts 56 of levers 46 with upper faces 33 of upper rims 32 of slideway 26, levers 46 are urged resiliently outward by springs 49, their extreme position being determined by the action of control fingers 120 coming up against a stop at upper ends 126 of openings 122.

The movement of vertical downward introduction causes cooperation of curved lower surfaces 57 with upper faces 33 as far as the position illustrated in FIG. 9, permitting introduction of levers 46 into interior 34 of slideway 26, the pivoting movements of levers 46, while mutually moving closer to each other, being made possible by the free travel of control fingers 120 inside openings 122.

In FIGS. 8 and 9, or in other words during introduction, pivot 110 always occupies its same vertical position P1 relative to oblong hole 112 of upper part 44.

The vertical introduction travel ends when runners 102 come up against a stop at the portions of plane surface 103.

Levers 46 can then pivot, spreading apart from each other until control fingers 120 are stopped against upper ends 126 of openings 122.

The maneuvering members (not shown in the figures) of expandable mechanism 42 then cause pivot 110 to move back upward to its position P2 inside oblong hole 112.

Figure 10:
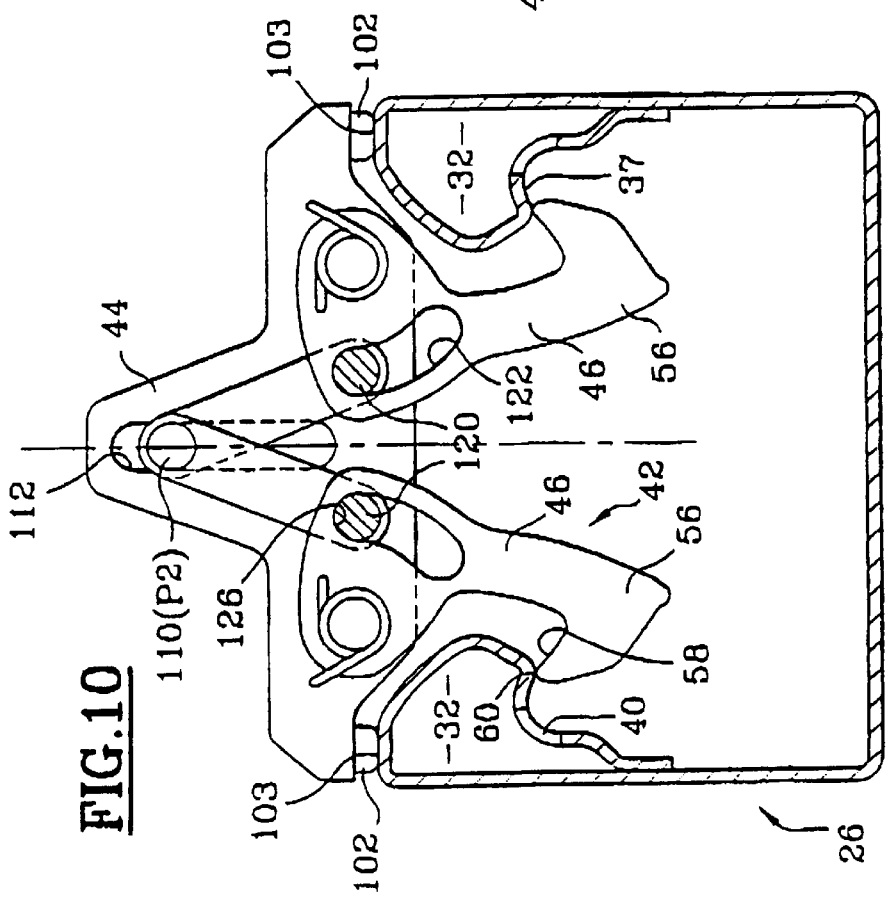
FIG. 10 is a view similar to that of FIG. 9, in which the foot is illustrated in adjustment position.

In the adjustment position illustrated in FIG. 10, upper faces 58, 60 forming hooks at active lower ends 56 of locking levers 46 are disposed facing lower surfaces 37 of box-like upper rims 32 of slideway 26, and lower part 44 is this way retained vertically upward relative to slideway 26, while lower part 44 and the associated foot can slide longitudinally in such a way as to permit adjustment of the longitudinal position of the foot relative to slideway 26.

Figure 11:
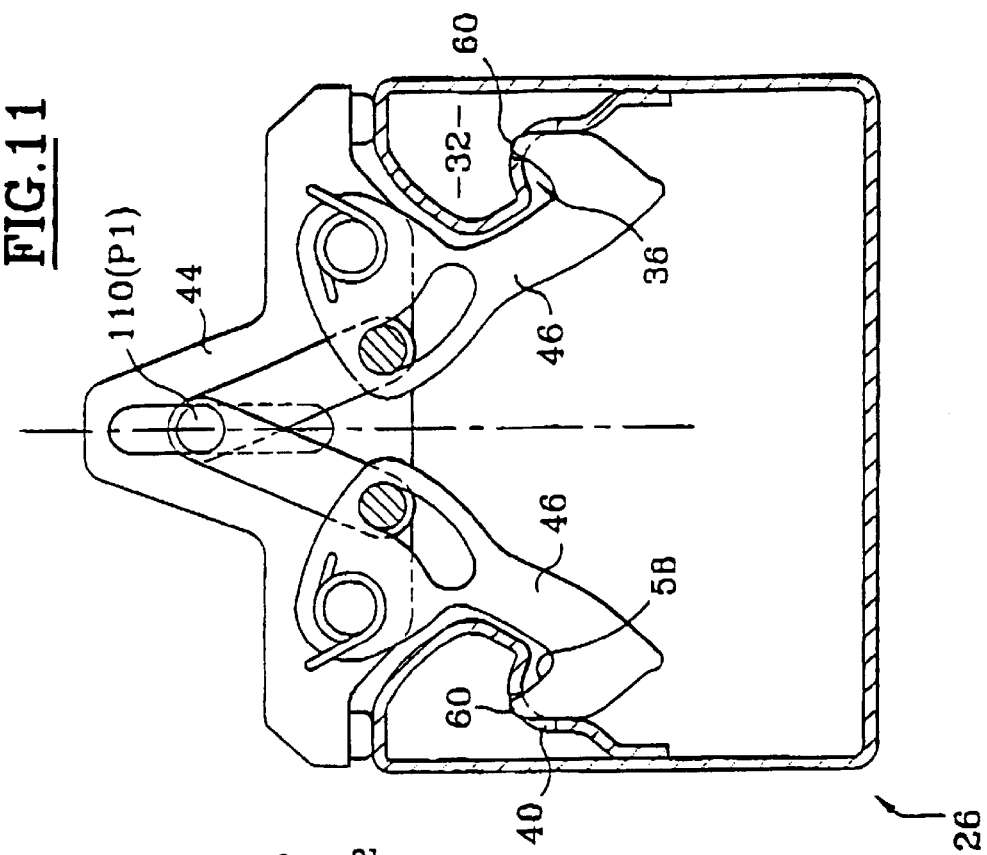
FIG. 11 is a view similar to that of FIG. 10, in which the foot is illustrated in longitudinally blocked position relative to the slideway.

Once the adjusted position has been reached, the user blocks lower part 44 longitudinally relative to slideway 26 by making hooks 58, 60 penetrate into notches 40 of internal portions 36 of the box-like upper rims, as illustrated in FIG. 11.

To achieve this, the user acts on the maneuvering members to return pivot 110 to its position P1, thus inducing additional outward pivoting travel of locking levers 46 permitting penetration of tips 60 of hooks 58 into notches 40.

Part 44 is in this way blocked longitudinally relative to slideway 26.

It is possible to lock it in blocked position, as illustrated in FIG. 12. For this purpose, the user acts on the maneuvering members to bring pivot 110 into its maximum lower position P3 illustrated in FIG. 12, in which position it comes up against a stop at lower end 114 of oblong hole 112.

This vertical downward travel of pivot 110 causes displacement of rods 106 until control fingers 120 come up against a stop at lower ends 124 of openings 122, thus preventing any pivoting of levers 46 in the sense of moving them mutually closer to each other, while then locking levers 46 in blocked and locked position with hooks 58, 60 in notches 40.

To disengage mechanism 42 vertically upward, starting from the position illustrated in FIG. 12, it is necessary to bring locking levers transversely closer to each other.

To achieve this, the user causes a displacement of pivot 110 toward its fourth position P4, which is its maximum high position, in which it comes up against a stop at upper end 116 of oblong hole 112.

This vertically upward maneuver of pivot 110 causes a rising and pivoting of rods 106 which, through the action of control fingers 120 which cooperate with upper ends 126 of openings 122, bring locking levers 46 mutually closer together.

As a function of the application and, for example, depending on whether subassembly 20 comprises a seat that must be firmly secured or else an accessory such as a shelf, one or more feet 24, such as two front feet or two rear feet, may be constructed according to the teachings of the invention.

What is claimed is:

1. A device for adjusting a longitudinal position of a subassembly on a horizontal floor of a passenger compartment of a motor vehicle and for blocking the subassembly in an adjusted position, which comprises:

two parallel slideways each having a pair of longitudinally extending, parallel upper rims and a central longitudinal slot located therebetween which accommodate, in a longitudinal sliding manner, members for guiding longitudinal displacements of the subassembly and for locking feet of the subassembly, the subassembly being of a substantially vertical orientation, in an adjusted position, wherein the lower end of at least one of the feet comprises a movable expandable mechanism having two locking members controlled between:

a first position, comprising one of an engagement position and a disengagement position, in which said two locking members are movable with symmetric and opposed action relative to a central longitudinal plane into an inwardly retracted position, in which a transverse width of said locking members permits one of a vertical introduction and a vertical extraction of the mechanism in the slideway via the central longitudinal slot of the slideway; and a second extreme position, comprising a locking position, in which each of the two locking members is extendable transversely outward to face an internal portion of one of the upper rims of the slot, with which are cooperable in fastening, so as to vertically and longitudinally immobilize one of the feet relative to the slideway;

said mechanism being movable through at least one intermediate position, comprising an adjustment position, in which each of the two locking members is extended transversely outward to face said internal portion of one of the upper rims of the slot, to retain the foot vertically relative to the slideway and permit longitudinal displacements of the foot relative to the slideway.

2. A device according to claim 1, wherein the locking members comprise locking levers, each of which is mounted to pivot, in the vicinity of its upper end, around a longitudinal hinge pin, which is supported by one of the feet and an active lower part of which has a profile complementary to a profile of the internal portion of a rim of the slot of the slideway which faces it.

3. A device according to claim 2, wherein an upper face of a lower end of each level comprises a hook which cooperates with the lower fastening face of said internal portion.

4. A device according to claim 3, wherein the lower fastening face of said internal portion comprises a series of longitudinally distributed notches, each of which comprises a locking catch for accommodating a lower hook-shaped end of a locking lever.

5. A device according to claim 3, which comprises a resilient biasing mechanism, wherein the locking levers are resiliently biased toward an extreme locking position by said biasing mechanism.

6. A device according to claim 5, wherein each of said lever comprises a biasing mechanism wherein a lower face of a lower end of each lever is in such a manner as to be cooperable with an upper guide face of said internal portion to retract the lever transversely inward, against an action of said resilient biasing mechanism, during engagement of the mechanism in the slideway.

7. A device according to claim 5 wherein the levers include hinge pins wherein the mechanism has a fork for control of the levers said fork being mounted so as to be movable by sliding vertically relative to the hinge pins of the levers, and each of the forks has two branches which cooperate via a cam profile with a control peg supported by each lever in the vicinity of a lower eng thereof such that displacements of which, from a high position to a low unlocking position, generate a retraction movement of the levers transversely inward, against the resilient biasing mechanism.

8. A device according to claim 7, wherein at least one of the locking feet comprises a support wherein the levers and the control fork are mounted movably relative to said support, said support being slidable vertically over the lower part of the foot between a low position and a high active locking position, and wherein a lower part of the foot is braced vertically on the bottom of the slideway via a mechanism for guiding the longitudinal displacements of said at least one of the feet relative to the slideway.

9. A device according to claim 5, which comprises a control rod wherein an upper part of each lever has a hinge pin and is provided with an arc shaped opening centered on said hinge pin, and which comprises a control finger positionable in the opening and supported by a lower end of said control rod, said control rod having an upper end which is mounted pivotably, around a longitudinal pin, on a control slide which is vertically movable relative to the lower part of the foot.

10. A device according to claim 9 wherein the subassembly comprises a motor vehicle seat.

* * * * *